US012043326B2

(12) United States Patent
Biagi et al.

(10) Patent No.: US 12,043,326 B2
(45) Date of Patent: Jul. 23, 2024

(54) STEERING SYSTEM FOR VEHICLES WITH INDEPENDENT AXLES

(71) Applicant: DANA MOTION SYSTEMS ITALIA S.R.L., Reggio Emilia (IT)

(72) Inventors: Mirko Biagi, Riva del Garda (IT); Stefano Fasano, Reggio Emilia (IT); Matteo Grott, Villa Lagarina (IT); Nicola Francesco Musciagna, San Giovanni (IT)

(73) Assignee: Dana Motion Systems Italia S.r.l., Reggio Emilia (IT)

( * ) Notice: Subject to any disclaimer, the term of this patent is extended or adjusted under 35 U.S.C. 154(b) by 729 days.

(21) Appl. No.: 17/283,982

(22) PCT Filed: Oct. 9, 2019

(86) PCT No.: PCT/IB2019/058610
§ 371 (c)(1),
(2) Date: Apr. 9, 2021

(87) PCT Pub. No.: WO2020/075092
PCT Pub. Date: Apr. 16, 2020

(65) Prior Publication Data
US 2021/0380162 A1    Dec. 9, 2021

(30) Foreign Application Priority Data
Oct. 11, 2018   (IT) .................. 102018000009334

(51) Int. Cl.
*B62D 5/09*   (2006.01)
*F15B 15/20*  (2006.01)

(52) U.S. Cl.
CPC ............... *B62D 5/09* (2013.01); *F15B 15/20* (2013.01)

(58) Field of Classification Search
CPC ...... B62D 5/09; B62D 7/1536; B62D 7/1554; B62D 7/1563; B62D 7/1572; B62D 7/159;
(Continued)

(56) References Cited

U.S. PATENT DOCUMENTS 4,398,616 A * 8/1983 Braden ............... B62D 7/1509
                                               180/414
5,230,399 A * 7/1993 Plate .................. B62D 5/097
                                               180/414
(Continued)

FOREIGN PATENT DOCUMENTS

| DE | 4334279     | 4/1995 |
| DE | 102007048027 | 5/2008 |
| GB | 2272409     | 5/1994 |

OTHER PUBLICATIONS

European Patent Office, International Search Report and Written Opinion in Application No. PCT/IB2019/058610, dated Jan. 22, 2020, 11 pages, Rijswijk Netherlands.
(Continued)

*Primary Examiner* — Anne Marie M Boehler
(74) *Attorney, Agent, or Firm* — Marshall & Melhorn, LLC

(57) ABSTRACT

A steering system for vehicles with independent axles is disclosed. The system may have a second circuit for control of a second cylinder. The second circuit may have a solenoid valve, with at least four ways and three positions. The solenoid valve may be interposed between a second hydraulic liquid inlet line, a second hydraulic liquid outlet line, and a third operating duct and a fourth operating duct for the passage of hydraulic liquid. The system moreover envisages an electronic unit for management and control of the directional-control solenoid valve, which is operatively connected to a device for detecting the steering angle imposed
(Continued)

by the first cylinder and is designed to manage the directional-control solenoid valve as a function of the data detected by the device.

14 Claims, 12 Drawing Sheets

(58) Field of Classification Search
CPC .. B62D 7/1581; B62D 9/1509; B62D 7/1509; F15B 15/20
USPC ................................................. 180/414, 415
See application file for complete search history.

(56) References Cited

U.S. PATENT DOCUMENTS

| | | | | |
|---|---|---|---|---|
| 5,392,214 | A | * | 2/1995 | Momose ................ B62D 7/159 706/900 |
| 5,526,891 | A | * | 6/1996 | Goloff .................. B62D 7/1509 180/417 |
| 5,718,304 | A | * | 2/1998 | Lee ....................... B62D 7/1572 180/433 |
| 6,067,782 | A | | 5/2000 | Diekhans |

OTHER PUBLICATIONS

Italian Patent and Trademark Office, Search and Examination Report in Application No. IT201800009334, dated Jun. 6, 2019, 9 pages. The Hague Netherlands.

* cited by examiner

STEERING SYSTEM FOR VEHICLES WITH INDEPENDENT AXLES

The subject of the present invention is a steering system for vehicles with independent axles.

Known to the art are vehicles with steering systems with independent axles, i.e., with the possibility of operating with one or two steering axles and, hence, with two-wheel steering (2WS) or four-wheel steering (4WS). The above steering systems are generally used, for example, in work vehicles of the so-called off-highway type, where the operator, on the basis of the working conditions, sets the most adequate operating mode.

The above systems generally envisage a hydraulic power source (pump), which, through a hydraulic steering unit, of the hydraulic-power-steering type, supplies a first steering cylinder, connected to a first axle shaft that carries a first pair of wheels, according to the steering angle imposed by the operator on a steering wheel, or other driving member, connected to the unit itself. The flow of oil at outlet from the first cylinder is intercepted by a valve for directional control of the flow, which is designed to divert it towards the discharge when the operating mode with one steering axle (2WS) is set and to send it to a second steering cylinder, connected to a second axle shaft that carries a second pair of wheels, when the operating mode with two steering axles (4WS) is set. Between the aforesaid directional-control valve and the second cylinder there may be provided a further valve that makes it possible to manage supply and discharge of the second cylinder to obtain steering of the second axle shaft in phase or in phase opposition with respect to the first axle shaft according to the operating mode set by the operator.

The first and second cylinders are generally set, respectively, on the front and rear axle shafts of the vehicle.

According to the above configuration of the steering system, the second cylinder is hence connected in series to the first cylinder.

The above steering systems of a known type are not free from drawbacks, amongst which to be mentioned is the fact that in the four-wheel steering operating mode the hydraulic power supplied by the pump is shared between the two cylinders and, hence, also the total steering force that can be obtained is shared between them, with the consequence that the operator must apply a greater force on the steering wheel, with a considerable reduction in driving comfort.

The main task of the present invention is to eliminate the drawbacks of the known art referred to above by providing a steering system for vehicles with independent axles that will make it possible to achieve levels of performance and driving comfort unvaried in the case of operation with one steering axle or with two steering axles.

In the framework of the above technical task, another aim of the present invention is to enable effective and reliable operation even in the event of possible failure.

A further aim of the present invention is to guarantee adequate conditions of safety for operators who have the task of driving the vehicles.

Yet another aim of the present invention is to enable easy installation on vehicles, both on newly built ones and on ones already in use, without requiring particular structural modifications thereto.

Not the least important aim of the present invention is for the above system to present a simple structure, that is relatively easy to implement, ensures safe use and effective operation, as well as having a relatively contained cost.

The above task and the above aims are all achieved by the present steering system for vehicles with independent axles, which comprise a first hydraulic steering cylinder, a second hydraulic steering cylinder, and a first circuit for control of said first cylinder, which comprises a hydraulic steering unit, interposed between a first hydraulic liquid inlet line, a first hydraulic liquid outlet line, and a first operating duct and a second operating duct for the passage of hydraulic liquid, which are associated in fluid communication with respective chambers of the first cylinder, said system being characterized in that it comprises a second circuit for control of said second cylinder, which comprises a solenoid valve for directional control of the flow with at least four ways and three positions, of which a first steering position, a neutral position, and a second steering position interposed between a second hydraulic liquid inlet line, a second hydraulic liquid outlet line, and a third operating duct and a fourth operating duct for the passage of hydraulic liquid, which are associated in fluid communication with respective chambers of said second cylinder, there being moreover provided an electronic unit for management and control of the directional-control solenoid valve, which is operatively connected to first means for detecting the steering angle imposed by the first cylinder and is designed to manage the directional-control solenoid valve as a function of the data detected by the first detection means.

BRIEF DESCRIPTION OF THE DRAWINGS

Further characteristics and advantages of the present invention will emerge more clearly from the detailed description of two preferred, though non-exclusive, embodiments of a steering system for vehicles with independent axles, which is illustrated by way of indicative, but non-limiting, example in the annexed plates of drawings, wherein.

DETAILED DESCRIPTION

Figure 1:
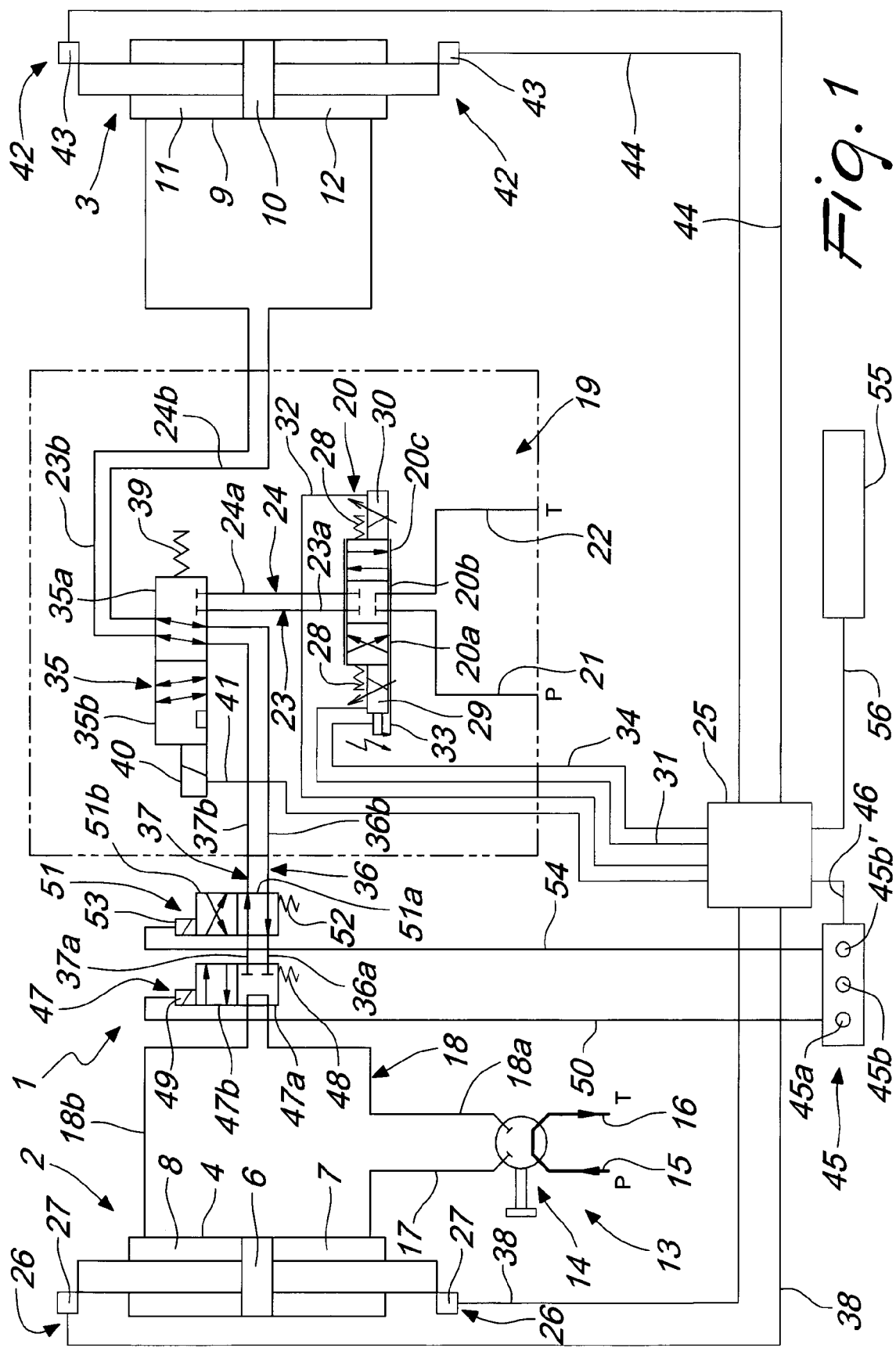
FIG. 1 is a schematic representation of a first embodiment of a steering system for vehicles with independent axles according to the invention in resting conditions.

With particular reference to the above figures, designated as a whole by 1 is a steering system for vehicles with independent axles.

The system 1 comprises a first steering cylinder 2 and a second steering cylinder 3.

The first cylinder 2 comprises a liner 4 slidably inserted inside which is a double-stem piston 6. Defined between the inner walls of the liner 4 and the piston 6, on opposite sides of the piston itself, are two chambers 7 and with volume variable as a function of the position assumed by the piston 6 along the liner 4.

Likewise, the second cylinder 3 comprises a liner 9, slidably inserted inside which is a double-stem piston 10. Defined between the inner walls of the liner 9 and the piston 10, on opposite sides of the piston itself, are two chambers 11 and 12 with volume variable as a function of the position assumed by the piston 10 along the liner 9.

The system 1 comprises a first circuit 13 for control of the first cylinder 2, which includes a hydraulic steering unit 14 interposed between a first line 15 for inlet of hydraulic liquid at a first pressure, a first line for outlet of hydraulic liquid at a second pressure lower than the first, and a first operating duct 17 and a second operating duct 18 for the passage of hydraulic liquid at respective pressures, which are in fluid communication with respective chambers 7 and 8 of the first cylinder 2.

With reference to the figures, the first operating duct 17 and the second operating duct 18 are interposed between the hydraulic steering unit 14 and, respectively, the chambers 7 and 8 of the first cylinder 2.

The hydraulic liquid used in the first circuit 13 is of the hydraulic-oil type.

Hence, the hydraulic steering unit 14 is provided with four ports, of which a first port is in fluid communication with the first inlet line 15, a second port is in fluid communication with the first outlet line 16, a third port is in fluid communication with the first operating duct 17, and a fourth port is in fluid communication with the second operating duct 18.

In use, the first inlet line 15 is connected to a source of hydraulic liquid under pressure of the conventional pump type, with fixed or variable displacement, and the first outlet line 16 is connected to a discharge tank.

The hydraulic steering unit 14 is of a conventional hydraulic-power-steering type designed to be connected to the steering wheel, or other driving member, of the vehicle on which the system 1 is installed.

The hydraulic steering unit 14 is designed to assume alternatively different operating conditions as a function of the commands imposed by the operator on board the vehicle on the steering wheel, or other driving member.

The hydraulic steering unit 14 can assume alternatively a resting configuration in the absence of steering (FIGS. 1 and 12), a first operating configuration in the case of steering in a first direction (FIGS. 2, 4, 6, 8, and 10), and a second operating configuration in the case of steering in a second direction (FIGS. 3, 5, 7, 9, and 11).

In the resting configuration, the hydraulic steering unit 14 sets in communication the first inlet line 15 with the first outlet line 16, while the first operating duct 17 and second operating duct 18 remain isolated. The hydraulic liquid passes directly from the first inlet line 15 to the first outlet line 16, without driving any displacement of the piston 6 of the first cylinder 2.

In the first operating configuration, the hydraulic steering unit 14 sets in communication the first inlet line with the second operating duct 18 and the first operating duct 17 with the first outlet line 16. The hydraulic liquid coming from the first inlet line 15, through the hydraulic steering unit 14 and the second operating duct 18, enters the chamber 8 of the first cylinder 2, causing a displacement of the piston 6 in a first direction D1 corresponding to the first steering direction. To enable displacement of the piston 6, the hydraulic liquid present in the chamber 7 exits through the first operating duct 17 and the hydraulic steering unit 14 towards the first outlet line 16.

In the second operating configuration, the hydraulic steering unit 14 sets in communication the first inlet line with the first operating duct 17 and the second operating duct 18 with the first outlet line 16. The hydraulic liquid coming from the first inlet line 15, through the hydraulic steering unit 14 and the first operating duct 17, enters the chamber 7 of the first cylinder 2 causing a displacement of the piston 6 in a second direction D2 corresponding to the second steering direction. To enable displacement of the piston 6, the hydraulic liquid present in the chamber 8 exits through the second operating duct 18 and the hydraulic steering unit 14 towards the first outlet line 16.

The configuration assumed by the hydraulic steering unit 14 hence depends upon the commands imposed by the operator on the steering wheel, or other driving member, which directly determines actuation of the first cylinder 2 and, hence, the steering angle imposed by the first cylinder.

The system 1 further comprises a second circuit 19 for control of the second cylinder 3, which comprises a directional-control solenoid valve 20, with at least four ways and three positions, of which a first steering position 20a, a neutral position 20b, and a second steering position 20c interposed between a second line 21 for inlet of hydraulic liquid at a third pressure, a second line 22 for outlet of hydraulic liquid at a fourth pressure lower than the third, and a third operating duct 23 and a fourth operating duct 24 for the passage of hydraulic liquid at respective pressures, which are in fluid communication with respective chambers 11 and 12 of the second cylinder 3.

With reference to the figures, the third operating duct 23 and fourth operating duct 24 are interposed between the directional-control solenoid valve 20 and, respectively, the chambers 11 and 12 of the second cylinder 3.

The directional-control solenoid valve 20 is hence provided with a first way in fluid communication with the second inlet line 21, a second way in fluid communication with the first outlet line 22, a third way in fluid communication with the third operating duct 23, and a fourth way in fluid communication with the fourth operating duct 24.

The hydraulic liquid used in the second circuit 19 is of the hydraulic-oil type.

In use, the second inlet line 21 is connected to a source of hydraulic liquid under pressure of the conventional pump type, with fixed or variable displacement, and the second outlet line 22 is connected to a discharge tank.

The first inlet line 15 and second and second inlet line 21 may be connected to respective sources of hydraulic liquid under pressure (in this case, the first and third pressures may be the same or different) or else to a single source of hydraulic liquid under pressure (in this case, the first and third pressures are the same as one another).

The system 1 further comprises an electronic unit 25 for management and control of the directional-control solenoid valve 20, which is operatively connected to first means 26 for detecting the steering angle imposed by the first cylinder 2 and is designed to switch the directional-control solenoid valve 20 as a function of the data detected by the first detection means 26.

Preferably, the directional-control solenoid valve 20 is of a proportional type.

The first detection means 26 comprise at least one first sensor 27 designed to measure the steering angle imposed by the first cylinder 2 in a direct or indirect way, for example through the measurement of the axial displacement of the piston 6, according to known technologies. Preferably, two first sensors 27 are provided designed to measure the steering angle imposed by the first cylinder 2, which work in parallel to guarantee in all cases proper operation of the system 1 in the event of failure of one of the two. The first sensors 27 may, for example, be of an optical type.

The first sensors 27 are connected to the electronic unit 25 by means of respective electrical-connection lines 38.

The electronic unit 25 comprises a conventional electronic board programmed for controlling and managing the directional-control solenoid valve 20. In particular, the electronic unit 25 is programmed for keeping/switching the directional-control solenoid valve 20 in/into the neutral position 20*b* when the first detection means 26 measure a zero steering angle imposed by the first cylinder 2 (hydraulic steering unit 14 in the resting configuration) and switching/keeping the solenoid valve itself into/in the first steering position 20*a* or the second steering position 20*c* according to the steering angle measured by the first detection means 26 (when the hydraulic steering unit 14 is in the first operating configuration or in the second operating configuration).

The directional-control solenoid valve 20 is normally kept in rest position 20*b* by the springs 28 and envisages respective electric drives 29 and 30 for switching into the first steering position 20*a* or the second steering position 20*c*.

The electric drives 29 and 30 may be of the conventional electromagnetic-coil type that act on the mobile spool within the valve body of the directional-control solenoid valve 20 and are connected to the electronic unit 25 by means of a first electrical-connection line 31 and a second electrical-connection line 32, respectively.

In this way, actuation of the second cylinder 3 is managed by the electronic unit 25 through the directional-control solenoid valve 20 on the basis of processing of the data detected by the first detection means 26.

In normal operating conditions of the system 1, the first and second cylinders 2 and 3 are hence supplied in parallel through independent circuits 13 and 19 and both exploit the maximum hydraulic power available. Moreover, the driving comfort for the operator who is driving the vehicle is always optimal, in so far as the action that he has to exert on the steering wheel, or other driving member, has an effect only on actuation of the first cylinder 2.

Preferably, the directional-control solenoid valve 20 comprises a sensor 33 for control of the position assumed by the mobile spool within the valve body, which is connected to the electronic unit 25 by means of a third electrical-connection line 34.

Through the control sensor 33, the electronic unit 25 can detect any possible malfunctioning of the directional-control solenoid valve 20.

Preferably, also provided are second means 42 for detecting the steering angle imposed by the second cylinder 3, which are operatively connected to the electronic unit 25 for performing a feedback control of actuation of the second cylinder itself by means of the directional-control solenoid valve 20. The electronic unit 25 is hence designed to compare the steering angle effectively imposed by the second cylinder 3, by means of driving of the directional-control solenoid valve 20 managed by the electronic unit 25 itself, with the theoretical one, processed by the operating algorithm with which the electronic unit 25 is programmed for making possible corrections or issuing warnings of malfunctioning. It is to be noted that the ratio between the steering angle imposed by the first cylinder 2 and the one imposed by the second cylinder 3 may be equal to, or greater or less than, 1.

The second detection means 42 comprise at least one second sensor 43 designed to measure the steering angle imposed by the second cylinder 3 in a direct or indirect way, for example through the measurement of the axial displacement of the piston 10, according to known technologies.

Preferably, two second sensors 43 are provided, designed to measure the steering angle imposed by the second cylinder 3, which work in parallel to guarantee in all cases proper operation of the system 1 in the event of failure of one of the two. The second sensors 43 may, for example, be of an optical type.

The second sensors 43 are connected to the electronic unit 25 by means of respective electrical-connection lines 44.

Advantageously, the system 1 also comprises a bypass solenoid valve 35, with six ways and two positions, which intercepts the third operating duct 23 and fourth operating duct 24 and is in fluid communication with a first bypass duct 36 and a second bypass duct 37, which are in turn associated with one between the first operating duct 17 and the second operating duct 18.

With reference to the figures, the bypass duct 36 and bypass duct 37 are associated with the second operating duct 18, but not excluded is the possibility of them being associated with the first operating duct 17.

The bypass solenoid valve 35 divides the third operating duct 23 into two stretches, of which a first stretch 23*a* is interposed between the directional-control solenoid valve 20 and the bypass solenoid valve 35, and a second stretch 23*b* is interposed between the latter and the corresponding chamber 11 of the second cylinder 3.

Likewise, the bypass solenoid valve 35 divides the fourth operating duct 24 into two stretches, of which a first stretch 24*a* is interposed between the directional-control solenoid valve 20 and the bypass solenoid valve 35, and a second stretch 24*b* is interposed between the latter and the corresponding chamber 12 of the second cylinder 3.

The bypass solenoid valve 35 is hence provided with six ways, of which a first way is in fluid communication with the first bypass duct 36, a second way is in fluid communication with the second bypass duct 37, a third way is in fluid communication with the first stretch 23*a* of the third operating duct 23, a fourth way is in fluid communication with the first stretch 24*a* of the fourth operating duct 24, a fifth way is in fluid communication with the second stretch 23*b* of the third operating duct 23, and a sixth way is in fluid communication with the second stretch 24*b* of the fourth operating duct 24.

The bypass solenoid valve 35 is designed to assume, alternatively, a first operating configuration 35*a*, in which the first bypass duct 36 and second bypass duct 37 are in fluid communication, respectively, with the second stretches 23*b* and 24*b* of the third operating duct 23 and fourth operating duct 24, while the first stretches 23*a* and 24*a* are isolated, or a second operating configuration 35*b*, in which the first stretches 23*a* and 24*a* of the third operating duct 23 and fourth operating duct 24 are in fluid communication with the corresponding second stretches 23*b* and 24*b*, and the first bypass duct 36 and second bypass duct 37 are in fluid communication with one another.

The bypass solenoid valve 35 is provided with a spring 39 for maintaining the first operating configuration 35*a* and with an electric drive 40 for switching into the second operating configuration 35*b*.

The electric drive 40 is of the conventional electromagnetic coil type that acts on the mobile spool within the valve body of the bypass solenoid valve 35 and is connected to the electronic unit 25 by means of a fourth electrical-connection line 41.

In the case of normal operation of the system 1 with two steering axles, the electronic unit 25 keeps the electric drive 40 energized in such a way that the bypass solenoid valve 35 remains in the second operating configuration 35b, maintaining the first circuit 13 and second circuit 19 isolated in such a way that the first cylinder 2 and second cylinder and 3 are supplied in parallel.

In the case where, instead, through the control sensor 33 and/or the second detection means 42, the electronic unit 25 detects malfunctioning of the system 1, the electric drive 40 is de-energized by the unit itself, and the spring 39 brings the bypass solenoid valve 35 back into the first operating configuration 35a, in which the first circuit 13 and second circuit 19 can be set in communication to supply the first cylinder 2 and second cylinder 3 in series, thus guaranteeing in all cases operation of the system 1.

This situation arises, for example, in the case where the electronic unit 25 does not detect, via the control sensor 33, any displacement of the spool of the directional-control solenoid valve 20 following upon energization of one of the two electric drives 29 or 30 (failure of the directional-control solenoid valve 20) or else in the case where a displacement of the coil is detected via the control sensor 33, but the steering angle measured by the second detection means 42 is different from the theoretical one processed by the electronic unit 25 (malfunctioning of the directional-control solenoid valve 20).

Advantageously, the system 1 comprises means 45 for selecting the steering mode, which are designed to select an operating condition from between an operating condition with one steering axle 45a and at least one operating condition with two steering axles 45b. The selection means can be actuated by an operator having the task of driving the vehicle on which the system 1 is installed. The selection means 45 are operatively connected to the electronic unit 25 by means of a fifth electrical-connection line 46. The electronic unit 25 is designed to enable operation of the directional-control solenoid valve 20 when the selection means 45 are configured in the at least one operating mode with two steering axles 45b and to keep the solenoid valve 20 in the neutral position 20b when the selection means 45 are in the operating mode with one steering axle 45a.

To enable operation with two steering axles even in the event of failure or malfunctioning described above, the system 1 comprises a first selection solenoid valve 47, with four ways and two positions, which intercepts the second operating duct 18 and is in fluid communication with the first bypass duct 36 and second bypass duct 37.

The first selection solenoid valve 47 hence divides the second operating duct 18 into two stretches, of which a first stretch 18a is interposed between the hydraulic steering unit 14 and the first selection solenoid valve 47 and a second stretch 18b is interposed between the latter and the chamber 8 of the first cylinder 2.

The first selection solenoid valve 47 is hence provided with four ways, of which a first way is in fluid communication with the first stretch 18a, a second way is in fluid communication with the second stretch 18b, a third way is in fluid communication with the first bypass duct 36, and a fourth way is in fluid communication with the second bypass duct 37.

It is to be noted that, in the case where the bypass ducts 36 and 37 were associated with the first operating duct 17, the first selection solenoid valve 47 would be set along the first operating duct 17 itself, instead of along the second operating duct 18.

The first selection solenoid valve 47 is designed to assume alternatively a first operating position 47a, in which it sets the first stretch 18a and second stretch 18b of the second operating duct 18 in communication, keeping, instead, the first bypass duct 36 and second bypass duct 37 isolated, or a second operating position 47b, in which it enables fluid communication between the first stretch 18a and the first bypass duct and between the second stretch 18b and the second bypass duct 37.

The first selection solenoid valve 47 is designed to assume the first operating position 47a when the selection means 45 are configured in the operating condition with one steering axle 45a or the second operating position 47b when the selection means 45 are configured in the at least one operating condition with two steering axles 45b.

The first selection solenoid valve 47 is provided with a spring 48 for maintaining the first operating position 47a and with an electric drive 49 for switching into the second operating position 47b.

The electric drive 49 is of the conventional electromagnetic-coil type that acts on the mobile spool within the valve body of the first selection solenoid valve 47 and is connected to the selection means 45 via a sixth electrical-connection line 50.

In the case where the selection means 45 are configured by the operator in the at least one operating mode with two steering axles 45b, the first selection solenoid valve 47 is hence switched into the second operating position 47b.

In this way, the first selection solenoid valve 47 sets itself in the configuration designed to enable supply in series of the first cylinder 2 and second cylinder 3 in emergency conditions. The bypass solenoid valve 35 in the first operating position 35a in any case maintains isolation of the first circuit 13 and second circuit 19, until the electronic unit 25 detects situations of faulty operation.

To be able to manage operation with two steering axles in phase (turn mode) or in phase opposition (crab mode) the selection means 45 may be configured, alternatively, in two operating modes with two steering axles, of which a mode with two steering axles in phase 45b and a mode with two steering axles in phase opposition 45b'.

On the basis of the operating mode, whether with two steering axles in phase 45b or with two steering axles in phase opposition or 45b', in which the selection means 45 are configured, the electronic unit 25 switches the directional-control solenoid valve 20 into the first steering position 20a or into the second steering position 20c as a function of the data measured by the first detection means 26 so as to obtain a displacement of the second cylinder 3 concordant or discordant with respect to that of the first cylinder 2.

To enable operation with two steering axles in phase or in phase opposition even in the conditions of failure or malfunctioning described above, the system 1 comprises a second selection solenoid valve 51, with four ways and two positions, which intercepts the bypass ducts 36 and 37 and is designed to assume alternatively one or the other operating position according to the operating mode, whether with two steering axles in phase 45b or with two steering axles in phase opposition 45b', in which the selection means 45 are configured.

The second selection solenoid valve 51 hence divides the first bypass duct 36 into a first stretch 36a interposed between the first selection solenoid valve 47 and the second solenoid valve 51 and a second stretch 36b interposed between the latter and the bypass solenoid valve 35.

Likewise, the second selection solenoid valve 51 divides the second bypass duct 37 into a first stretch 37a interposed between the first selection solenoid valve 47 and the second solenoid valve 51 and a second stretch 37b interposed between the latter and the bypass solenoid valve 35.

The second selection solenoid valve 51 is hence provided with four ways, of which a first way is in fluid communication with the first stretch 36a, a second way is in fluid communication with the first stretch 37a, a third way is in fluid communication with the second stretch 36b, and a fourth way is in fluid communication with the second stretch 37b.

The second selection solenoid valve 51 is designed to assume alternatively a first operating position 51a, in which it enables fluid communication between the first and second stretches 36a and 36b of the first bypass duct 36 and between the first and second stretches 37a and 37b of the second bypass duct 37, or a second operating position 51b, in which it enables fluid communication between the first stretch 36a of the first bypass duct 36 and the second stretch 37b of the second bypass duct 37 and between the first stretch 37a of the second bypass duct 37 and the second stretch 36b of the first bypass duct 36.

The second selection solenoid valve 51 is designed to assume the first operating position 51a when the selection means 45 are configured in the operating condition with two steering axles in phase 45b or the second operating position 51b when the selection means 45 are configured in the operating condition with two steering axles in phase opposition 45b'.

The second selection solenoid valve 51 is provided with a spring 52 for maintaining the first operating position 51a and with an electric drive 53 for switching into the second operating position 51b.

The electric drive 53 is of the conventional electromagnetic-coil type that acts on the mobile spool within the valve body of the second selection solenoid valve 51 and is connected to the selection means 45 via a seventh electrical-connection line 54.

In the case where the selection means 45 are configured by the operator in the operating mode with two steering axles in phase opposition 45b', the second selection solenoid valve 51 is hence switched into the second operating position 51b.

The system 1 is designed to be installed on a vehicle (not represented) with two independent steering axles, which comprises a first axle and a second axle of a known type carrying respective pairs of wheels, forming part of which are, respectively, the first and second cylinders 2 and 3. In particular, the system 1 may be installed on vehicles of a so-called off-highway type.

It is to be noted that the first and second detection means 26 and 42 may be designed to measure sliding of the piston or displacement of other mobile members of the axle from which the measurement the steering angle imposed on the wheels can be obtained or else they may be designed to measure directly the angular displacement of the wheels themselves, according to technologies known to the person skilled in the branch.

Generally, the first cylinder 2 is set at the front with respect to the direction of forward travel of the vehicle, and the second cylinder 3 is set at the back, but not ruled out is the possibility for the system 1 to be differently installed on the vehicle.

The system 1 then envisages integration of means 55 for measuring the speed of advance of the vehicle, which may be already present on the vehicle or may be provided for the purpose.

Said measurement means 55 are operatively connected to the electronic unit 25 by means of an eighth electrical-connection line 56.

In this way, when the selection means 45 are configured in one of the operating conditions with two steering axles 45b and 45b', the electronic unit 25 can carry out a combined monitoring of the data regarding the speed of advance of the vehicle detected by the measurement means 55 and the steering angle imposed by the second cylinder 3 measured by the second detection means 42, to switch/keep the directional-control solenoid valve 20 into/in the neutral position 20b when said data exceed pre-set threshold values, so as to bring back the system 1 into the operating mode with one steering axle and prevent operating conditions potentially dangerous for the operator who is driving the vehicle.

FIGS. 1-11 are circuit representations of a first embodiment of the system 1 in different functional configurations.

In FIG. 1 the system 1 is represented in resting conditions, i.e., in the absence of steering. The hydraulic steering unit 14 is in the resting configuration, and hence no displacement of the piston 6 of the first cylinder 2 is brought about. Consequently, irrespective of the operating mode in which the selection means 45 are configured, the directional-control solenoid valve 20 remains in the neutral position 20b so as to keep also the piston 10 of the second cylinder 3 stationary.

FIGS. 2-7 illustrate the system 1 in respective operating conditions during normal operation. In these figures, only the hydraulic components of the system 1 are represented, and the electrical/electronic components that carry out control and management of the system are not represented in detail.

Figure 2:
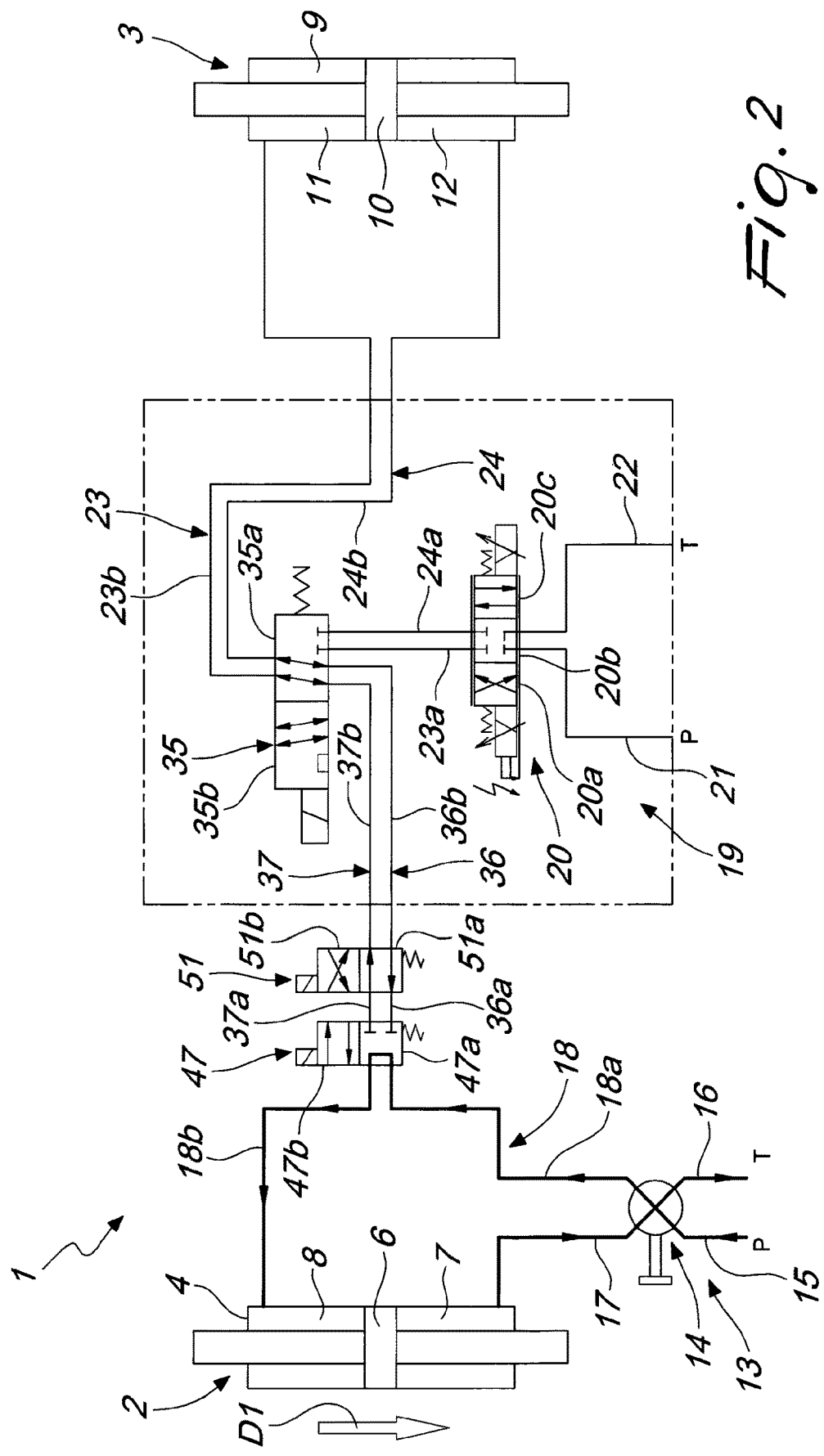
FIG. 2 is a schematic and partial representation of the system of FIG. 1 in a first operating condition.

In FIG. 2, the system 1 is represented in a first operating condition corresponding to an operating mode with one steering axle that is steering in a first direction.

The selection means 45 are configured in the operating mode with one steering axle 45a, so that the electronic unit 25 does not enable operation of the directional-control solenoid valve 20, which is kept in the neutral position 20b by the springs 28 in such a way that the piston 10 of the second cylinder 3 will not move.

The solenoid valves 35, 47, and 51 are not energized and are kept in the corresponding first positions 35a, 47a, 51a by the respective springs 39, 48, 52.

With the hydraulic steering unit 14 in the first operating configuration, the piston 6 of the first cylinder 2 moves in the first direction D1, corresponding to the first steering direction imposed by the operator on the steering wheel, or other driving member, of the vehicle.

Figure 3:
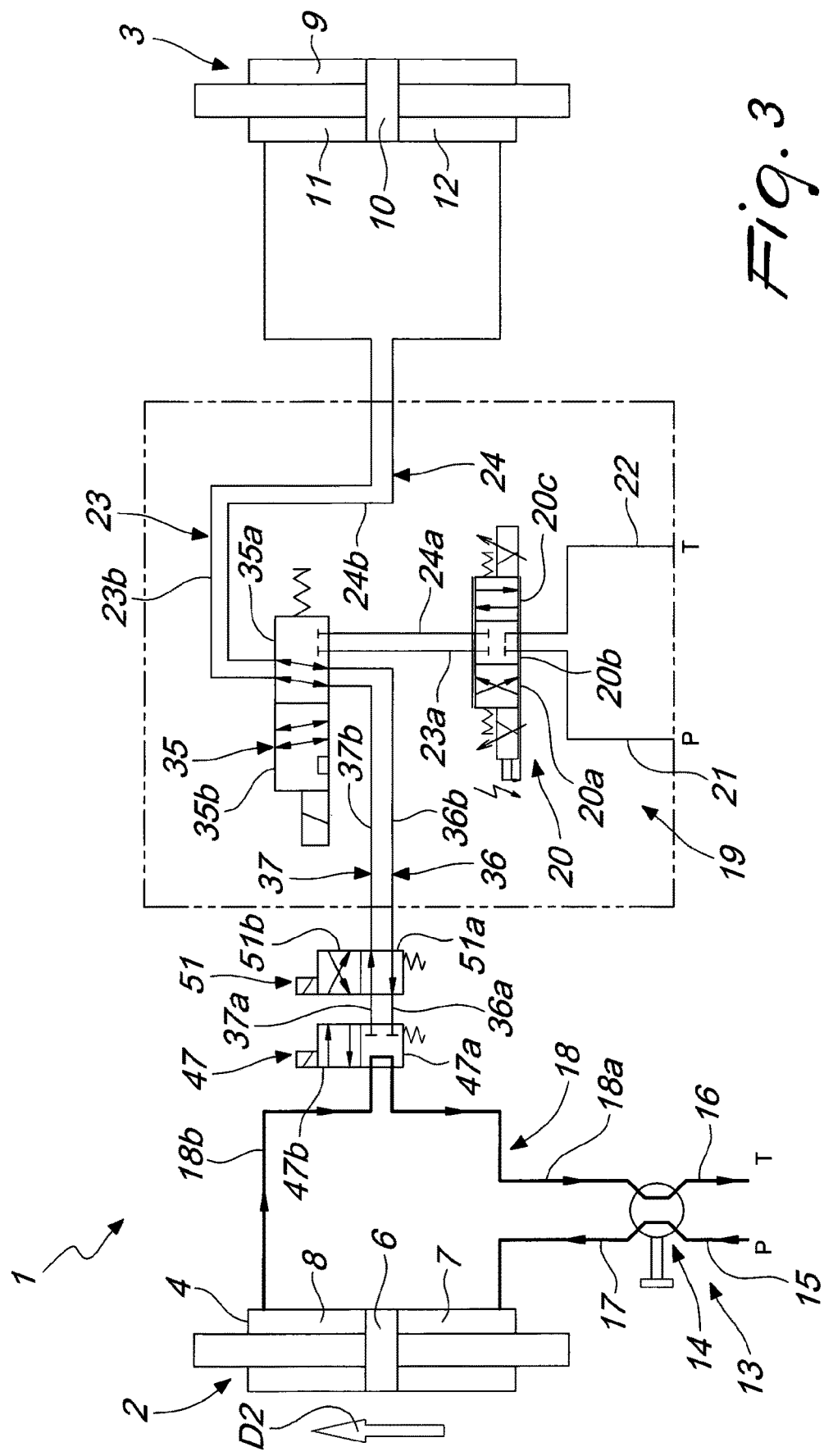
FIG. 3 is a schematic and partial representation of the system of FIG. 1 in a second operating condition.

FIG. 3 represents a third operating condition corresponding to an operating mode with one steering axle that is steering in a second direction, opposite to the first.

The system 1 is configured as described above, with the difference that the electronic steering unit 14 is in the second operating configuration so as to drive displacement of the piston 6 of the second cylinder 3 in the second direction D2, opposite to the first direction D1, corresponding to the second steering direction imposed by the operator on the steering wheel, or other driving member, of the vehicle.

Figure 4:
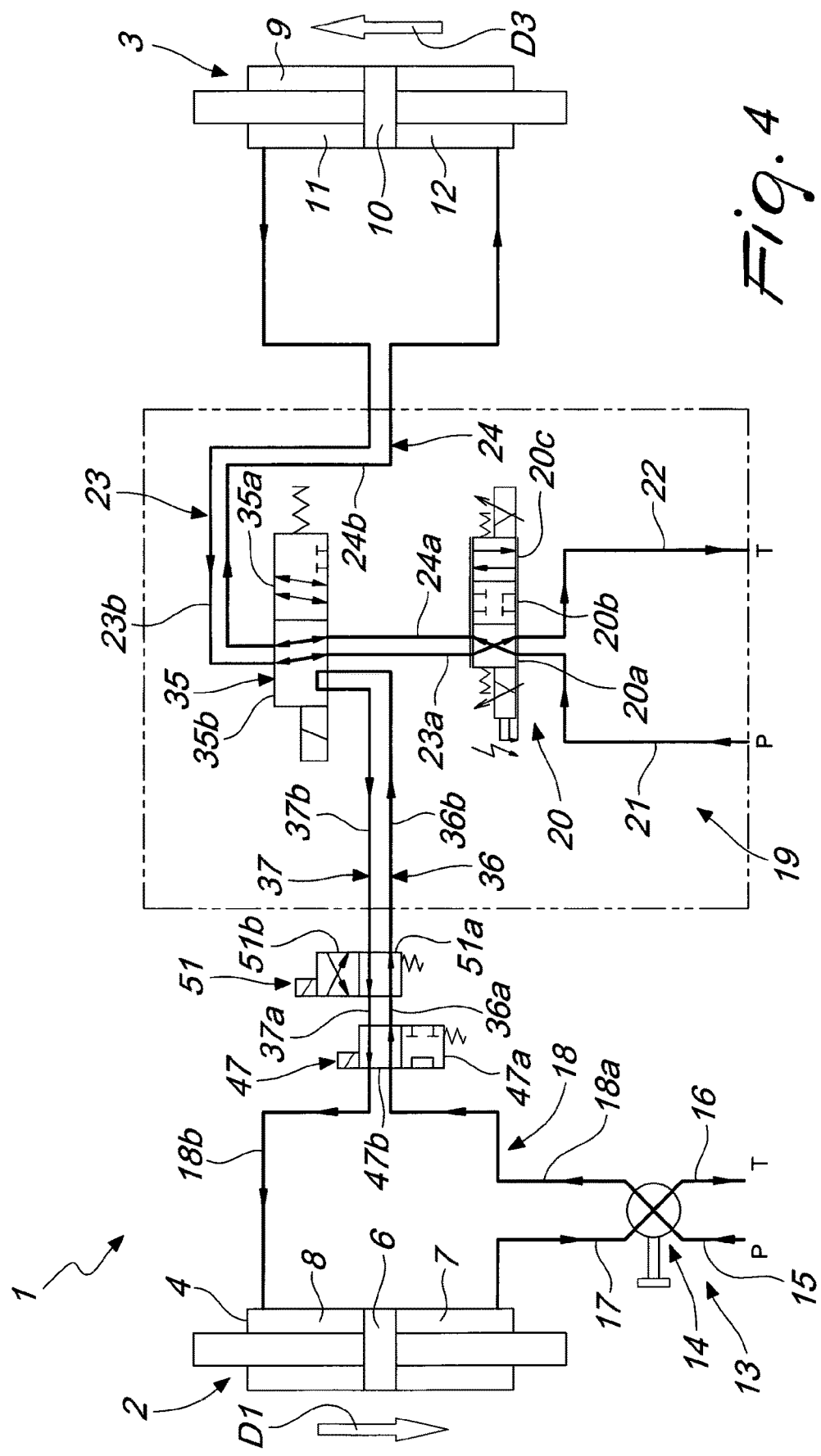
FIG. 4 is a schematic and partial representation of the system of FIG. 1 in a third operating condition.

In FIG. 4 the system 1 is represented in a third operating condition corresponding to an operating mode with two steering axles in phase in the first steering direction.

With the selection means 45 configured in the operating mode with two steering axles in phase 45b, the electronic unit 25 enables operation of the directional-control solenoid valve 20 and switches the bypass solenoid valve 35 into the second operating position 35b.

The first selection solenoid valve 47 is switched into the second operating position 47b so as to isolate the circuits 13 and 19, whereas the second selection valve 51 is not energized and remains in the first position 51a.

With the electronic steering unit 14 in the first operating configuration, the piston 6 of the first cylinder 2 is displaced in the first direction D1 corresponding to the first steering direction imposed by the operator on the steering wheel, or other driving member, of the vehicle.

On the basis of the data measured by the first detection means 26, the electronic unit 25 switches the directional-control valve 20 into the first steering position 20a to obtain a corresponding displacement of the piston 10 of the second cylinder 3 in a third direction D3, such as to obtain steering in phase in the first direction.

Figure 5:
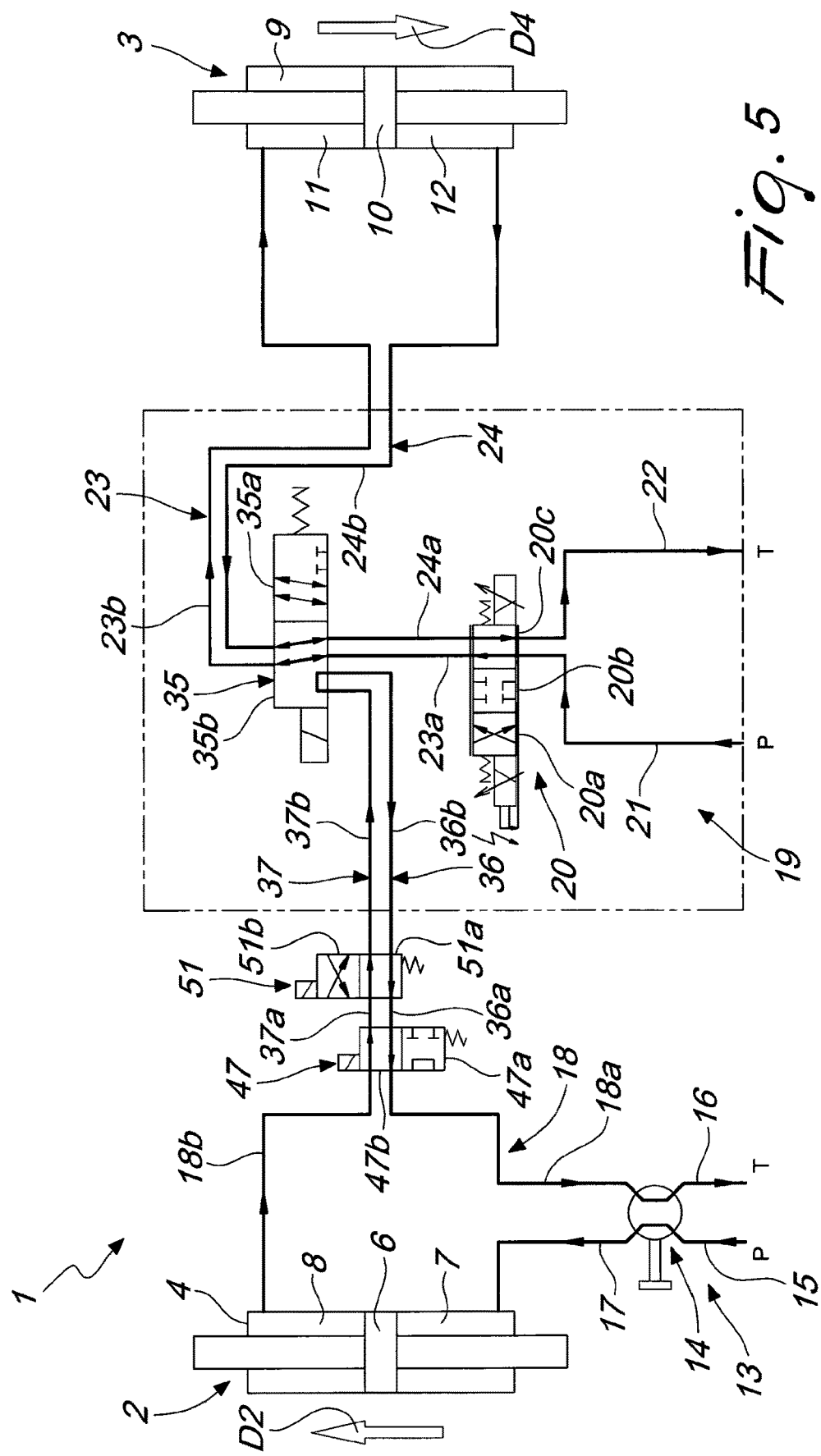
FIG. 5 is a schematic and partial representation of the system of FIG. 1 in a fourth operating condition.

In FIG. 5, the system 1 is represented in a fourth operating condition corresponding to an operating mode with two steering axles in phase in the second steering direction.

The system 1 is configured as described above with reference to FIG. 4, with the difference that the electronic steering unit 14 is in the second operating configuration so as to drive displacement of the piston 6 of the second cylinder 3 in the second direction D2, opposite to the first steering direction D1, corresponding to the second direction imposed by the operator on the steering wheel, or other driving member, of the vehicle.

Consequently, the electronic unit 25 switches the directional-control valve 20 into the second steering position 20c to obtain a corresponding displacement of the piston 10 of the second cylinder 3 in a fourth direction D4, opposite to the third direction D3, such as to obtain steering in phase in the second direction.

Figure 6:
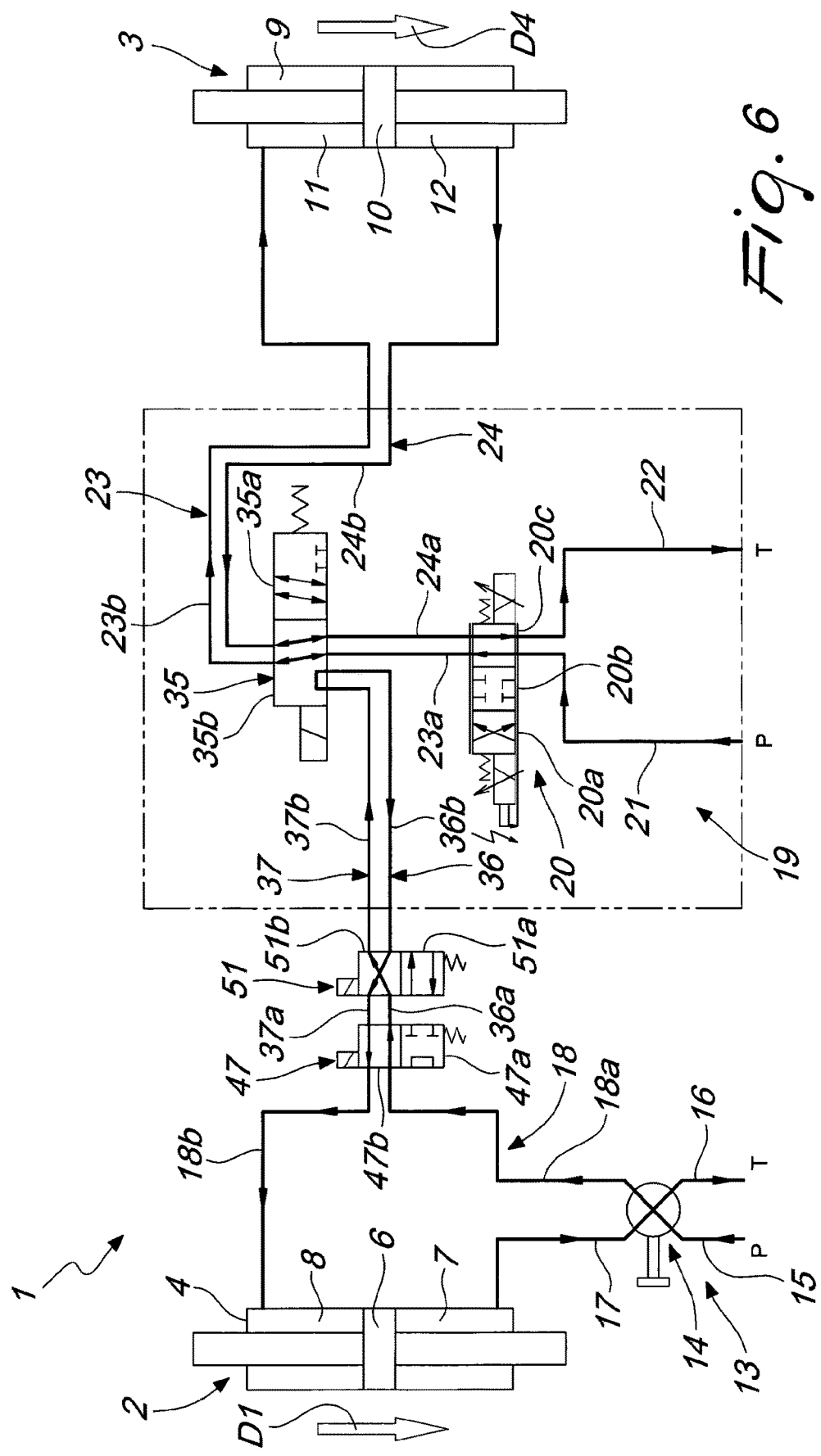
FIG. 6 is a schematic and partial representation of the system of FIG. 1 in a fifth operating condition.

In FIG. 6, the system 1 is represented in a fifth operating condition corresponding to an operating mode with two steering axles in phase opposition in the first steering direction.

With the selection means 45 configured in the operating mode with two steering axles in phase opposition 45b', the electronic unit 25 enables operation of the directional-control solenoid valve 20 and switches the bypass solenoid valve 35 into the second operating position 35b.

The first selection valve 47 is switched into the second operating position 47b so as to isolate the circuits 13 and 19. The second selection valve 51 is switched into the second operating position 51b so as to set itself for managing the system 1 adequately in the case of emergency.

With the electronic steering unit 14 in the first operating configuration, the piston 6 of the first cylinder 2 is displaced in the first direction D1 corresponding to the first steering direction imposed by the operator on the steering wheel, or other driving member, of the vehicle.

On the basis of the data measured by the first detection means 26, the electronic unit 25 switches the directional-control solenoid valve 20 into the second steering position 20c to obtain a corresponding displacement of the piston 10 of the second cylinder 3 in the fourth direction D4, such as to obtain steering in phase opposition in the first direction.

It is to be noted that, to obtain operation with two steering axles in phase opposition, the electronic unit 25 manages the directional-control solenoid valve 20 in a reverse way with respect to operation with two steering axles in phase; i.e., if to obtain operation with two steering axles in phase, for a given displacement of the piston 6, the directional-control solenoid valve 20 is switched into the first steering position 20a (or into the second steering position 20c), to obtain operation with two steering axles in phase opposition, the directional-control solenoid valve 20 is switched into the second steering position 20c (or into the first steering position 20a).

Figure 7:
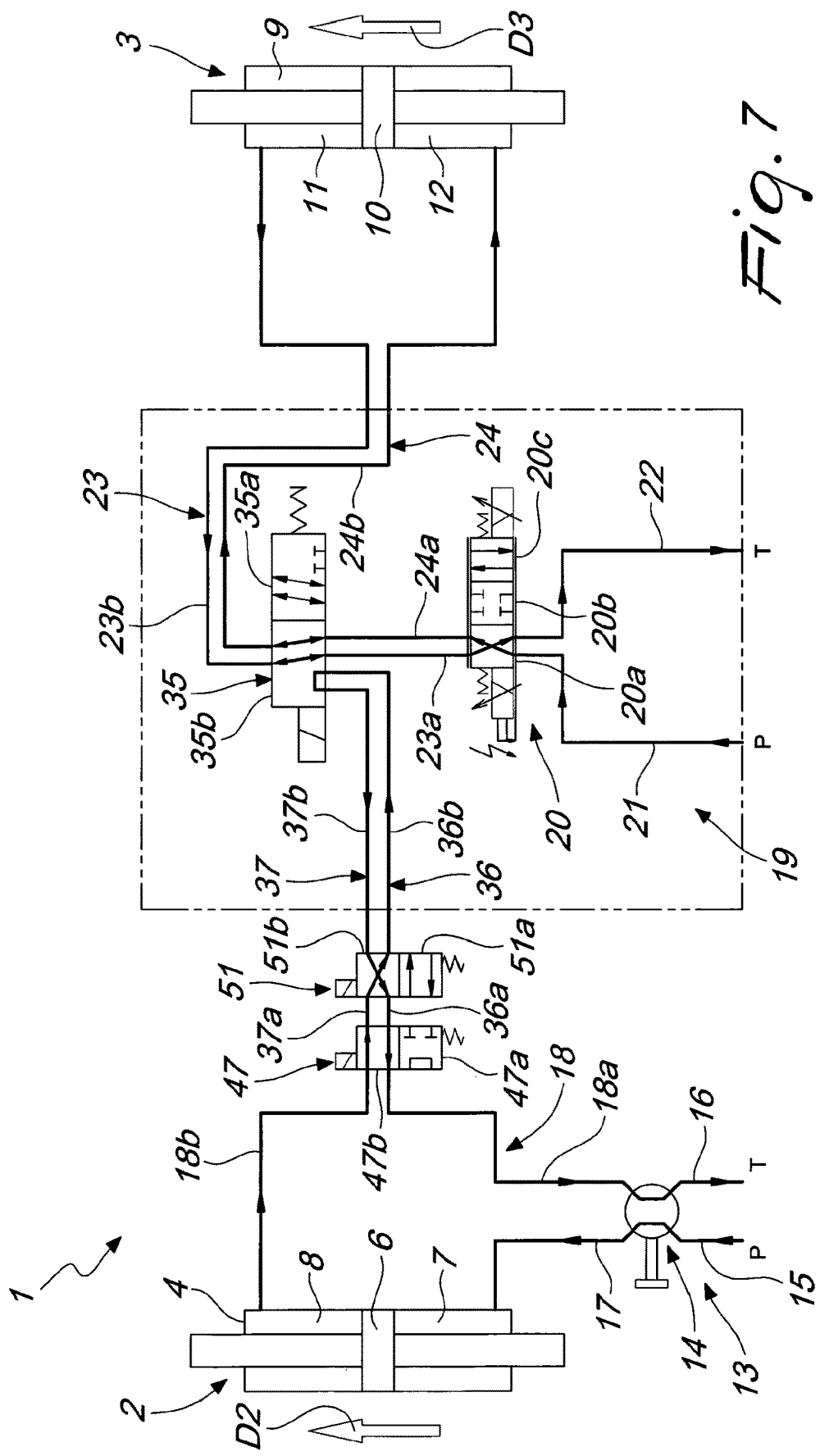
FIG. 7 is a schematic and partial representation of the system of FIG. 1 in a sixth operating condition.

In FIG. 7, the system 1 is represented in a sixth operating condition corresponding to an operating mode with two steering axles in phase opposition in the second steering direction.

The system 1 is configured as described above with reference to FIG. 6, with the difference that the electronic steering unit 14 is in the second operating configuration so as to drive displacement of the piston 6 of the second cylinder 3 in the second direction D2, opposite to the first direction D1, corresponding to the second steering direction imposed by the operator on the steering wheel, or other driving member, of the vehicle.

Consequently, the electronic unit 25 switches the directional-control solenoid valve 20 into the first steering position 20a to obtain a corresponding displacement of the piston 10 of the second cylinder 3 in the third direction D3, opposite to the fourth direction D4, opposite to the third direction D3, such as to obtain steering in phase opposition in the second direction.

FIGS. 8-11 illustrate the system 1 in respective operating modes with two steering axles in emergency conditions, i.e., when the electronic unit 25 detects any malfunctioning or faults in the second circuit 19 and enables supply in series of the first and second cylinders 2 and 3 through the bypass solenoid valve 35 in the first operating position 35a.

Figure 8:
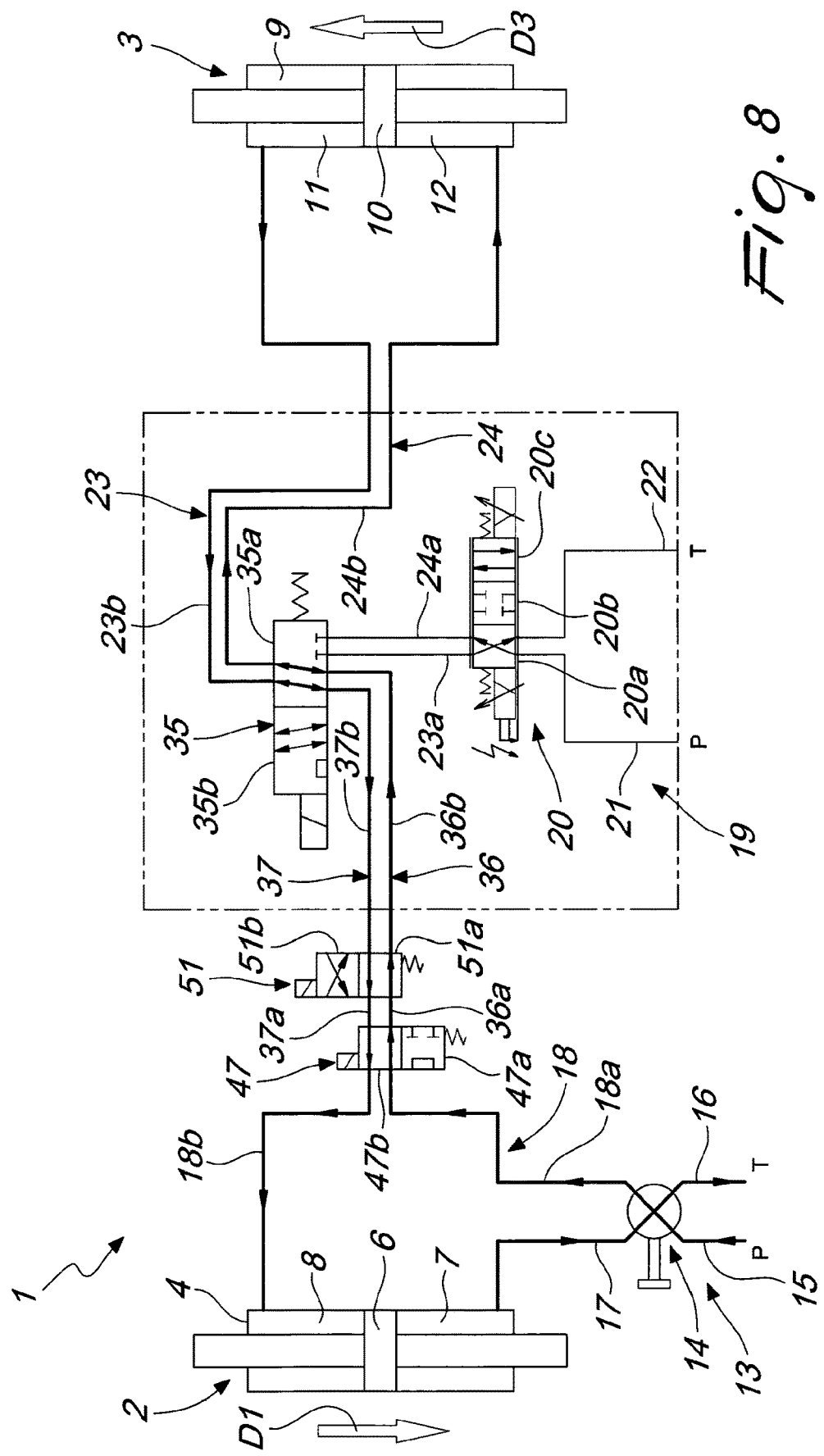
FIG. 8 is a schematic and partial representation of the system of FIG. 1 in a seventh operating condition.
Figure 9:
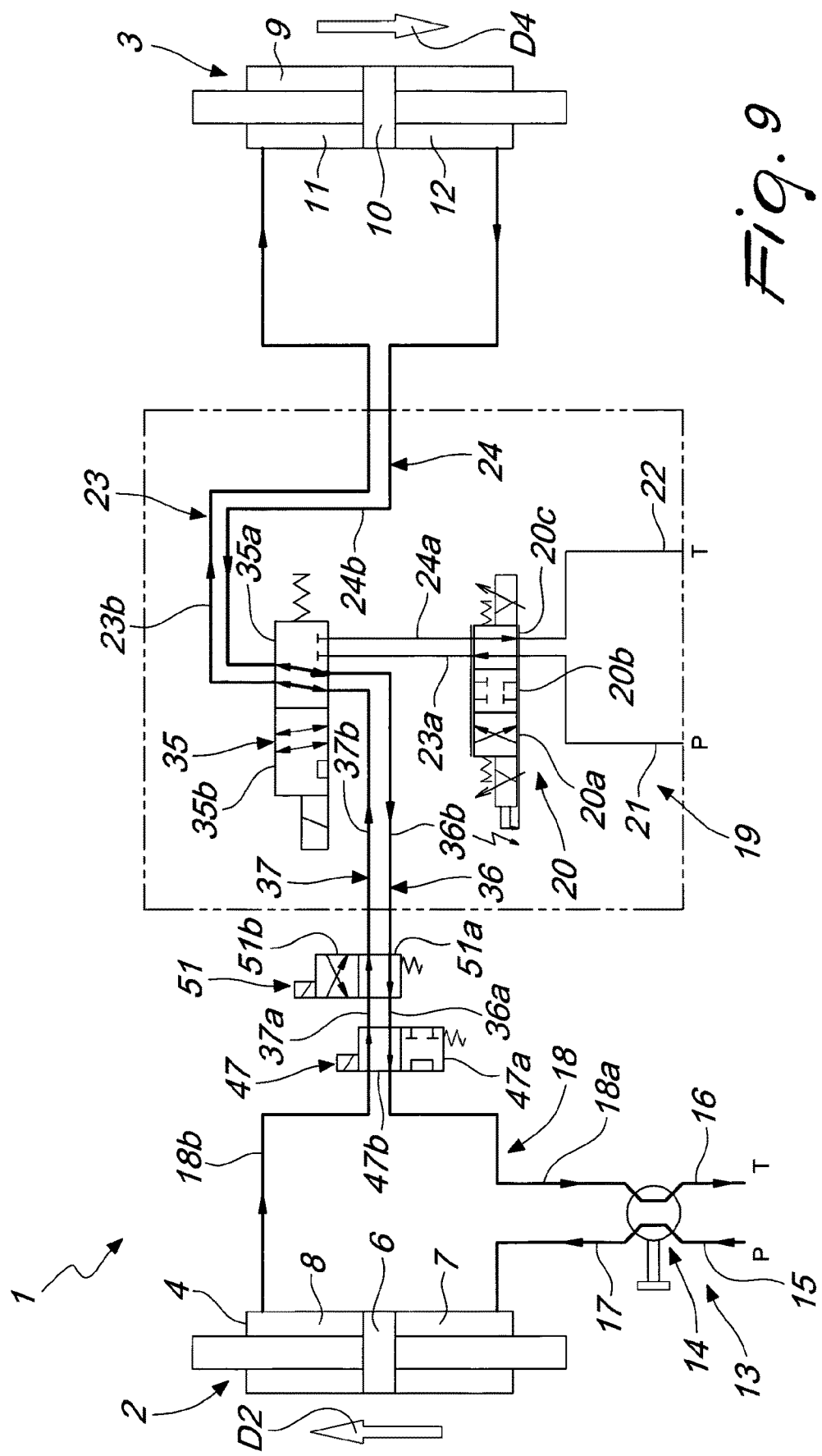
FIG. 9 is a schematic and partial representation of the system of FIG. 1 in an eighth operating condition.

In FIGS. 8 and 9 the system 1 is represented, respectively, in a seventh operating condition and in an eighth operating condition, which correspond to an operating mode with two steering axles in phase, respectively, in the first steering direction and in the second steering direction.

With the first selection solenoid valve 47 in the second operating position 47b and the second selection solenoid valve 51 in the first operating position 51a, the second cylinder 3 is supplied by the first circuit 13 through the bypass ducts 36 and 37 and the second stretches 23b and 24b of the third operating duct 23 and fourth operating duct 24 so as to drive displacement of the piston 10 of the second cylinder 3 in the third direction D3 or in the fourth direction D4 as a result of displacement of the piston 6 of the first cylinder 2 in the first direction D1 or in the second direction D2, respectively.

Figure 10:
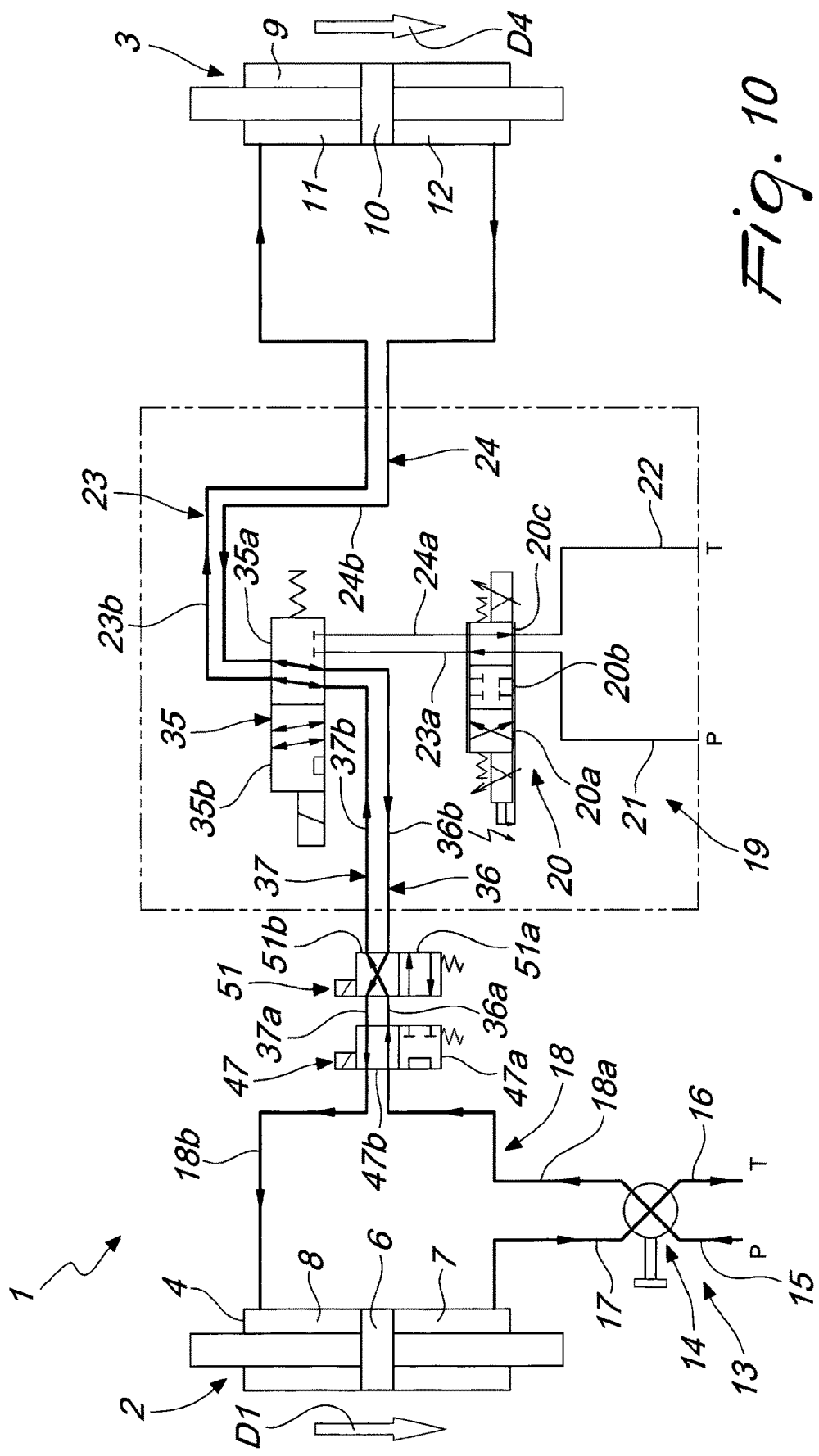
FIG. 10 is a schematic and partial representation of the system of FIG. 1 in a ninth operating condition.
Figure 11:
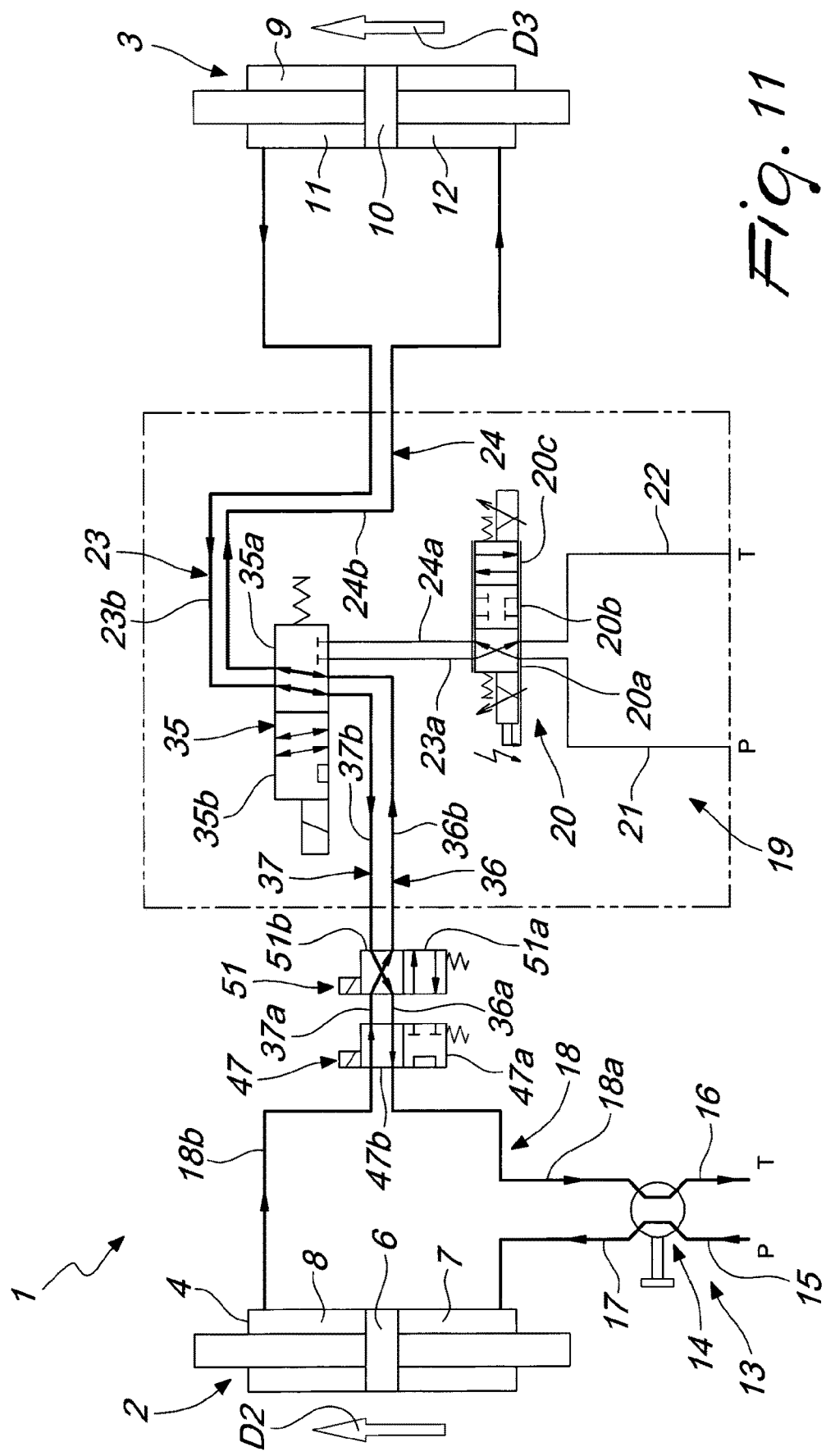
FIG. 11 is a schematic and partial representation of the system of FIG. 1 in a tenth operating condition.

In FIGS. 10 and 11, the system 1 is represented, respectively, in a ninth operating condition and in a tenth operating condition corresponding to an operating mode with two steering axles in phase opposition, respectively, in the first steering direction and in the second steering direction.

With the first selection solenoid valve 47 in the second operating position 47b and the second selection solenoid valve 51 in the second operating position 51b, the second cylinder 3 is supplied by the first circuit 13 through the bypass ducts 36 and 37 and the second stretches 23b and 24b of the third operating duct 23 and fourth operating duct 24 so as to drive displacement of the piston 10 of the second cylinder 3 in the fourth direction D4 or in the third direction D3 as a result of displacement of the piston 6 of the first cylinder 2 in the first direction D1 or in the second direction D2, respectively.

Figure 12:
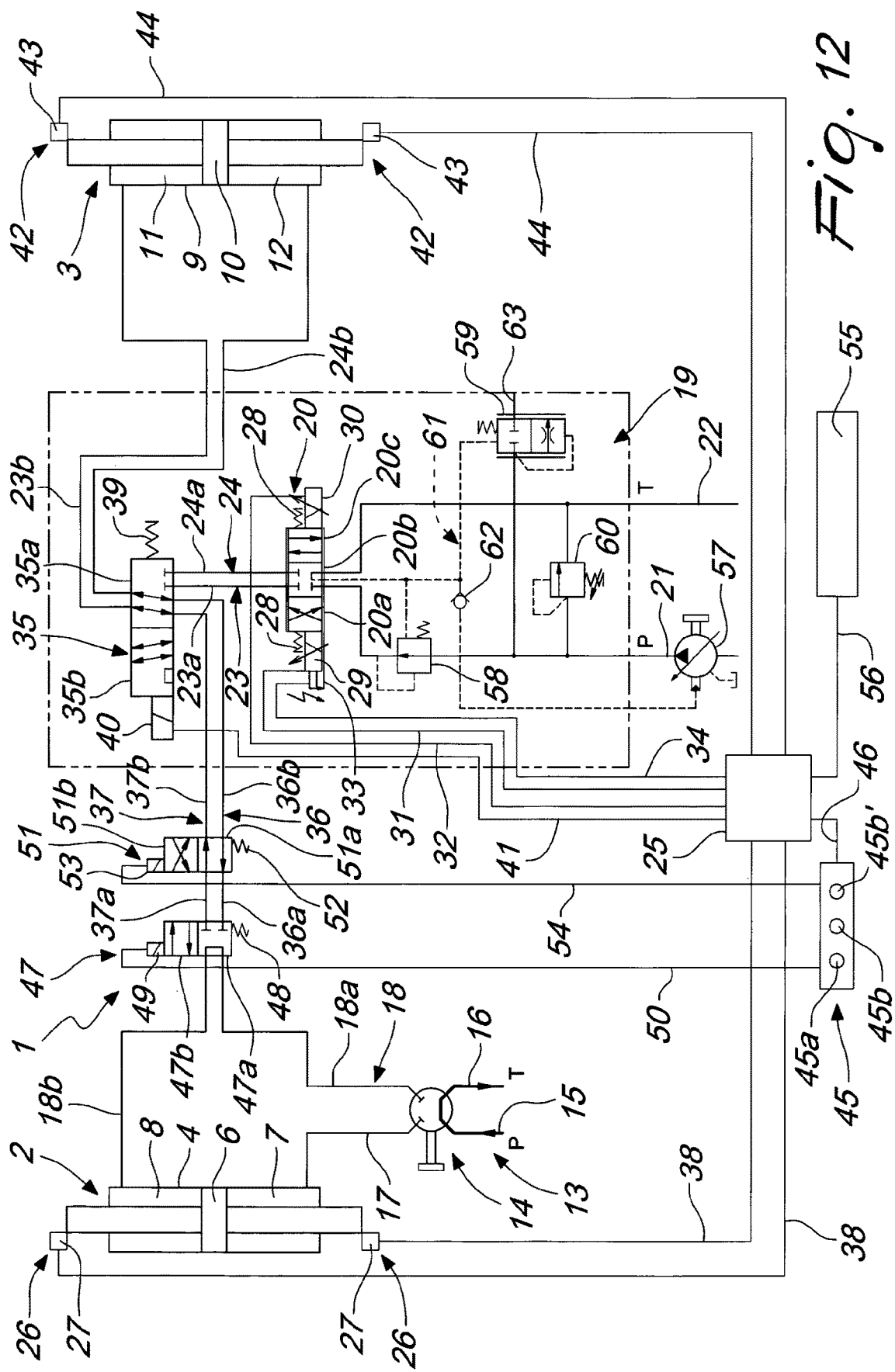
FIG. 12 is a schematic representation of a second embodiment of the system according to the invention in resting conditions.

FIG. 12 represents a second embodiment of the system 1, in which the second circuit 19, in addition to what has been described above, comprises the following components:

- a supply pump 57 associated with the second inlet line 21;
- a meter-in compensation valve 58, which intercepts the second inlet line 21 and enables the difference in pressure upstream and downstream of the directional-control solenoid valve 20 to be kept constant so as to obtain optimal working conditions;
- a priority compensation valve 59, which enables supply of a possible secondary working circuit that can be connected to the line 63, i.e., discharging of an excess of hydraulic liquid through the line 63 itself, in the case, for example, where the second inlet line 21 is supplied by a pump with fixed displacement;
- a pressure-relief valve 60 interposed between the second inlet line 21 and the second outlet line 22, which limits the rise in pressure on the second inlet line 21, for example, in the case where the second cylinder 3 is blocked by possible obstacles hit by the wheels of the corresponding axle;
- a load-sensing circuit 61, which connects the pump 5 7, the meter-in compensation valve 58, the priority compensation valve 59, and the directional-control solenoid valve 20 (which in this case is of the five-way, two-position type), provided with a non-return valve 62 that prevents flow of hydraulic liquid towards the pump 57.

In FIG. 12, the system 1 is represented in resting conditions, i.e., in the absence of steering, but operation in the various operating conditions remains what has been described above with reference to the first embodiment (FIGS. 1-11).

It has in practice been found how the invention described achieves the aims set, and in particular it is emphasized that the steering system according to the invention makes it possible to exploit all the hydraulic power available on both of the steering cylinders, achieving optimal driving conditions in all situations.

Moreover, the system according to the invention presents a high level of comfort for the operators who drive the vehicles on which it is installed, who are required to exert on the steering wheel less force.

Moreover, the system according to the invention is flexible in use and makes it possible to manage different operating modes of the vehicle.

In addition, the system according to the invention makes it possible to guarantee operation with two steering axles even in conditions of breakdown of some components and presents good characteristics of safety for the operators.

The invention thus devised may undergo numerous modifications and variations, all of which fall within the scope of the inventive idea.

Furthermore, all the items may be replaced by other technically equivalent elements.

In practice, the materials used, as well as the corresponding shapes and dimensions, may be any whatsoever according to the requirements, without thereby departing from the sphere of protection of the ensuing claims.

What is claimed:

1. A steering system for vehicles with independent axles, comprising:
    a first hydraulic steering cylinder,
    a second hydraulic steering cylinder,
    a first circuit for control of said first cylinder comprising a hydraulic steering unit, interposed between a first hydraulic liquid inlet line, a first hydraulic liquid outlet line, and a first operating duct and a second operating duct for the passage of hydraulic liquid, which are associated in fluid communication with respective chambers of the first cylinder,
    a second circuit for control of said second cylinder, which comprises a solenoid valve for directional control of the flow, with at least four ways and three positions, of which a first steering position, a neutral position, and a second steering position which is interposed between a second hydraulic liquid inlet line, a second hydraulic liquid outlet line, and a third operating duct and a fourth operating duct for the passage of hydraulic liquid, which are associated in fluid communication with respective chambers of said second cylinder, there moreover being provided an electronic unit for management and control of the directional-control solenoid valve, which is operatively connected to a first detection device for detecting a steering angle imposed by the first cylinder and is designed to manage the directional-control solenoid valve as a function of steering angle data detected by the first detection device, and
    a bypass solenoid valve with six ways and two positions that intercepts said third operating duct and fourth operating duct and is in fluid communication with a first bypass duct and a second bypass duct associated with one of said first operating duct and second operating duct, said bypass solenoid valve being designed to assume alternatively a first operating position, in which it enables fluid communication between the first bypass duct and the second bypass duct and the third operating duct and the fourth operating duct from/to said second cylinder, or a second operating position, in which it keeps the first bypass duct and the second bypass duct and the third operating duct and the fourth operating duct isolated.

2. The system according to claim 1, wherein said bypass solenoid valve is operatively connected to said electronic unit, the bypass solenoid valve being normally in the first operating position and being configured for being switched by the unit itself into the second operating position.

3. The system according to claim 1, further comprising a second detection device for detecting the steering angle imposed by said second cylinder, which are operatively connected to said electronic unit for feedback control of actuation of the second cylinder via said directional-control solenoid valve.

4. The system according to claim 1, further comprising a selection device for selecting an operating mode, which is designed to select alternatively between an operating mode with one steering axle and at least one operating mode with two steering axles and are operatively connected to said electronic unit for management of said directional-control solenoid valve, the electronic unit being designed to enable operation of the directional-control solenoid valve when the selection device is configured in the at least one operating mode with two steering axles and to keep the solenoid valve itself in the neutral position when the selection device is configured in the operating mode with one steering axle.

5. The system according to claim 4, wherein said selection device is designed to select alternatively between two of said operating modes with two steering axles, of which one with two steering axles in phase and one with two steering axles in phase opposition, the electronic unit being designed to switch the directional-control solenoid valve alternatively into the first steering position or into the second steering position as the data detected by the first detection device vary according to the operating mode, whether with two steering axles in phase or with two steering axles in phase opposition, in which the selection device is configured.

6. The system according to claim 5, further comprising a first selection solenoid valve, with four ways and two positions, which intercepts said first operating duct or said second operating duct and is in fluid communication with said first bypass duct and second bypass duct, the first selection solenoid valve being designed to assume alternatively a first operating position in which it keeps the first operating duct or the second operating duct and the first bypass duct and second bypass duct isolated, with the selection device configured in the operating mode with one steering axle, or a second operating position, in which it enables fluid communication between the first operating duct or the second operating duct and the first bypass duct and second bypass duct, with the selection device configured in the at least one operating mode with two steering axles.

7. The system according to claim 6, further comprising a second selection solenoid valve, with four ways and two positions, which intercepts said first and second bypass ducts, the second selection solenoid valve being designed to assume a first operating position or a second operating position according to the mode, whether with two steering axles in phase or with two steering axles in phase opposition in which the selection device is configured.

8. The system according to claim 7, wherein said second selection solenoid valve is set along said first and second bypass ducts between said first selection solenoid valve and said bypass solenoid valve.

9. The system according to claim 1, wherein said hydraulic steering unit comprises a hydraulic power steering system.

10. The system according to claim 1, wherein said first and second inlet lines are designed to be associated in fluid communication with respective sources of hydraulic liquid under pressure.

11. The system according to claim 1, wherein said first and second inlet lines are designed to be associated in fluid communication with a single source of hydraulic liquid under pressure.

12. A vehicle comprising a first steering axle and a second steering axle, wherein comprises a system according claim 1, wherein said first and second cylinders are associated with said first and second axles, respectively.

13. The vehicle according to claim 12, further comprising a measuring device for measuring the speed of advance, which is operatively associated with said electronic unit, wherein said electronic unit is designed to switch/keep said directional-control solenoid valve into/in the neutral position when the data detected by said first detection device and by said measurement device exceed respective threshold values set in the unit itself.

14. The vehicle according to claim 13, wherein said first cylinder is set at the front and said second cylinder is set at the back with respect to the direction of forward travel of the vehicle.

* * * * *